United States Patent [19]

Unozawa

[11] Patent Number: 5,036,732
[45] Date of Patent: Aug. 6, 1991

[54] METHOD FOR MAKING A CUTTING ELEMENT FOR USE IN A ROTARY CUTTING TOOL

[76] Inventor: Atsuo Unozawa, 2-30-27, Amanuma, Suginami-ku, Tokyo, Japan

[21] Appl. No.: 505,070

[22] Filed: Apr. 5, 1990

Related U.S. Application Data

[62] Division of Ser. No. 217,553, Jul. 11, 1988, Pat. No. 4,983,078.

[30] Foreign Application Priority Data

Jul. 13, 1987 [JP] Japan .................................. 62-174503

[51] Int. Cl.$^5$ ............................................... B21K 5/12
[52] U.S. Cl. ..................................................... 76/115
[58] Field of Search ................................ 76/101.1, 115

[56] References Cited

U.S. PATENT DOCUMENTS 1,927,409 9/1933 Markstrum ............................ 407/35

FOREIGN PATENT DOCUMENTS

| 33891 | 7/1975 | Japan . |
| 48529 | 4/1980 | Japan . |
| 211422 | 12/1982 | Japan . |
| 10417 | 1/1983 | Japan . |
| 10423 | 1/1983 | Japan . |

Primary Examiner—Roscoe V. Parker

[57] ABSTRACT

The inner peripheral portion of the blade material is made thinner than the outer peripheral portion thereof. This serves to make greater, as compared with conventional cutter bodies, the distance between the adjacent portions of the cutter body where the respective inner peripheral portions of the blade material are adapted to rest, thus enabling the rigidity of the cutting tool itself to be improved. On top of this, the rake face of the blade material can be re-ground, when necessary, until the material is completely used up and worn away, thus making it possible to make full and efficient use of the blade material without any waste.

2 Claims, 2 Drawing Sheets

FIG. 1
FIG. 2
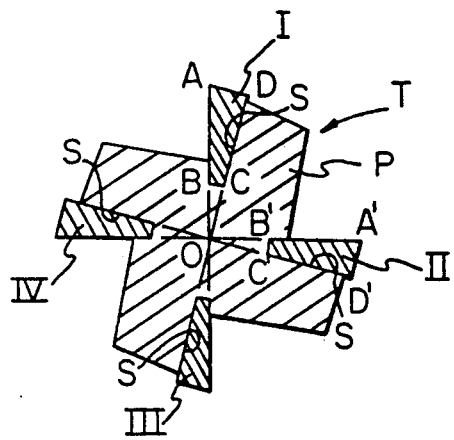
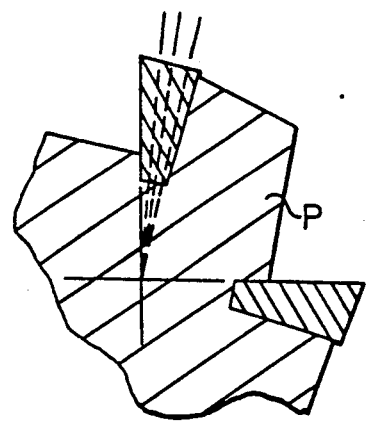
FIG. 3
FIG. 4
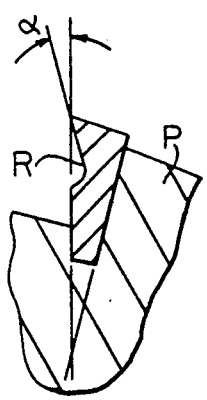
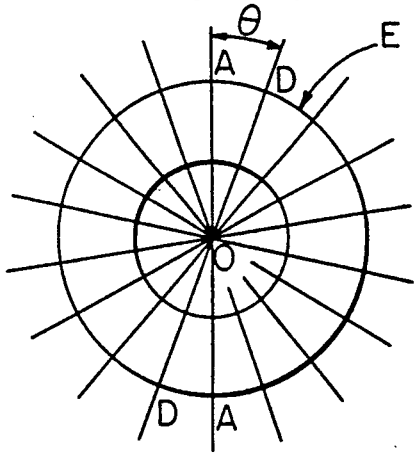
FIG. 5
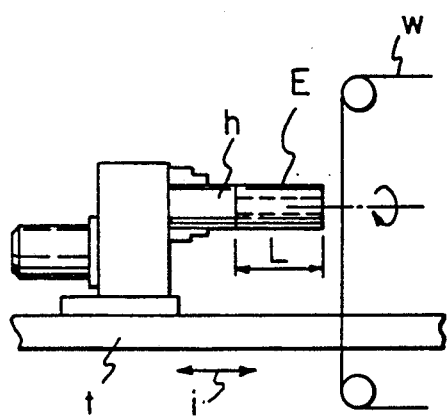

PRIOR ART

METHOD FOR MAKING A CUTTING ELEMENT FOR USE IN A ROTARY CUTTING TOOL

This is a divisional of application Ser. No. 217,553, filed on July 11, 1988, and now U.S. Pat. No. 4,983,078.

BACKGROUND OF THE INVENTION

The present invention relates to a rotary cutting tool such as an end mill, a reamer or the like in which cutting parts formed of a blade material such as a cemented carbide alloy, a high-speed steel or the like are secured to a cutter body i.e., blade rest which is generally formed of steel by means of welding or in any other mechanical manner, and more particularly to the configuration of cutting material which serves as a cutting part.

Blades for use as the cutting part of a rotating cutting tool are classified as being of two types; straight blades and helical blades, the differences being clearly visible when looking at the edges of the relevant blades, in other words, the cutting parts, in the axial direction. Both types of cutting parts are conventionally formed such that the cross sectional configurations thereof are rectangular. With such a cutting part, the rake face thereof is parallel to its opposite face. These features inherent to the conventional cutting parts result from the convenience of manufacturing them in this form. When producing these types of cutting parts using, for instance, cemented carbide alloy, in the case of straight blades, raw material in the form of a powder is pressure molded, is then cut into a rectangular parallelopipedon by means of a diamond grinder or the like, and is finally sintered. On the other hand, in the case of helical blades, raw material in the form of a powder is pressure molded in a helically formed mold, or a straight blade formed as described above can instead be reheated and forced into a metal mold with a helical form. Using this method of manufacture, the rake face can easily be constructed to be parallel to its opposite face.

It is also easy to manufacture a high-speed steel cutting part having the same cross sectional configuration as the one described above, in other words, a cutting part in which the rake face is constructed to be parallel to its opposite face. Almost all of the cutting parts currently used have such a cross sectional configuration.

As described heretofore, in the cutting parts Io, IIo - - - of a known rotary cutting tool, the rank faces (ab, a'b', —) are, as shown in FIGS. 6 to 8, substantially parallel to their opposite faces (cd, c'd', - - - ). In a tool To having such cutting parts, the proximal portion of a steel blade rest Po on which the cutting parts are secured, i.e. the portion (cb') defined between a first cutting part Io and a second cutting part IIo, for instance, tends to become narrower, the rigidity of the tool itself thus being diminished. In addition, when the rake face of the known cutting part is re-ground as indicated by dotted lines $a_1 b_1$, $a_2 b_2$, $a_3 b_3$, the thickness (ad) at the outer peripheral portion of the re-ground cutting part becomes smaller than the thickness (bc) at the inner peripheral portion thereof, thus making it impossible to use the blade material efficiently without any waste.

SUMMARY OF THE INVENTION

The present invention is directed to solving the drawbacks experienced with the known rotary cutting tools by dealing with the configuration of cutting parts.

To cope with the above-mentioned problems, a cutting part according to the present invention is formed such that the outer peripheral portion thereof is thicker than the inner peripheral portion.

The distance between adjacent inner peripheral portions of a blade rest is made greater by forming cutting parts for cutting tools in such a manner as is described above. This helps improve the rigidity of a cutting tool itself and efficiently makes full use of a blade material to such an extent that the face opposite to each rake face is completely used up and wears away when the rake faces are re-ground.

BRIEF DESCRIPTION OF THE DRAWING

FIG. 1 is an explanatory cross sectional view showing one embodiment of a rotary cutting tool constructed according to the present invention, FIG. 2 is a partial cross-sectional view illustrating how a rake face of the rotary cutting tool according to the present invention is re-ground, FIG. 3 is a partial cross-sectional view showing another embodiment of the rotary cutting tool according to the present invention, FIG. 4 is a cross-sectional view of a blade material for use in forming a rotary cutting part according to the present invention, FIG. 5 is a side view of an apparatus used in a helical cutting process for the blade material shown in FIG. 4.

DETAILED DESCRIPTION OF THE PREFERRED EMBODIMENT

A cutting tool T according to the present invention is shown in FIG. 1. As the figure shows, it is clear that, when looking at the tool T in the direction normal to its axis, each of the rake faces (AB, A'B', - - - ) and its opposite or back thrust face (CD, C'D', - - - ) of the cutting parts (I, II, - - - ), i.e. the cutting elements blades of the tool T, is disposed within an axial plane of and intersects the others at the shaft center 0. The proximal portion of a steel blade rest P is able to be made thicker by arranging the cutting parts as described above, thus making it possible to provide a tool like the tool T which can perform a hard cutting operation specifically, the blade rest or tool body P has a plurality of cutting element support surfaces S,S equal in number to said cutting elements, each of said cutting element support surfaces S being disposed in an axial plane of said central axis O and in face to face engagement with said back thrust face of an associated one of said cutting elements. Further with the cutting parts of the present invention, as shown in FIG. 2, it is possible to abrade the cutting material substantially equally when it is re-ground, which helps use up the material efficiently without any loss. This feature would be a tremendous advantage for a tool like the tool T in which a very expensive material is utilized.

As a person skilled in the art could easily infer, the present invention is able to be modified for the improvement of cutting capability by additionally providing a rake surface R which forms a rake angle α in each rake face (AB, A'B', - - -), as shown in FIG. 3.

Figure 6:
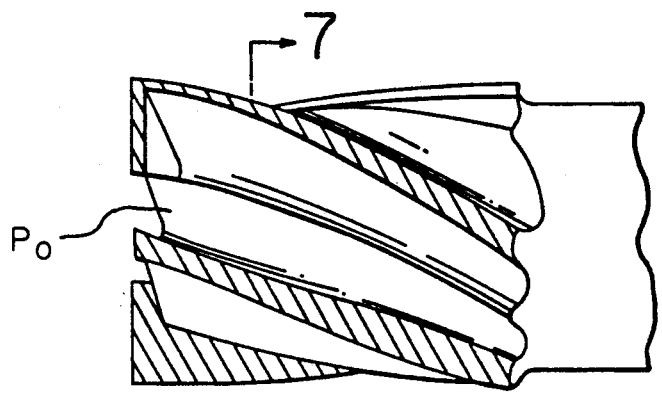
FIG. 6 is a side view showing one embodiment of a known rotary cutting tool.
Figure 7:
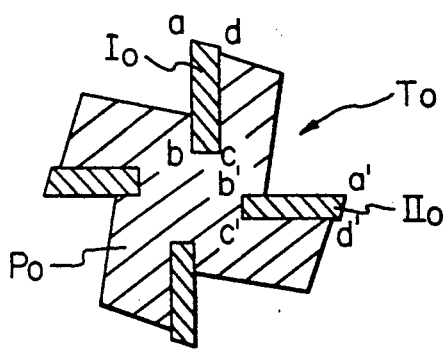
FIG. 7 is a cross-sectional view taken along the line VII—VII of FIG. 6 and looking in the direction indicated by the arrows.
Figure 8:
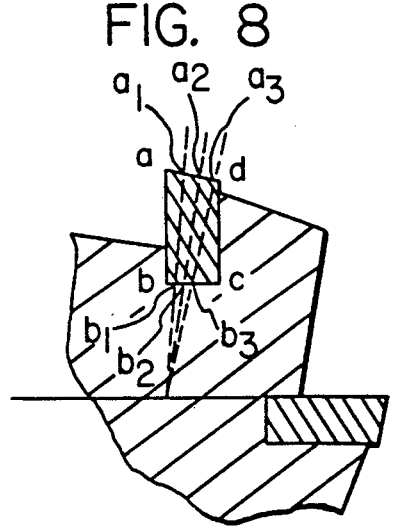
FIG. 8 is a partial cross-sectional view illustrating how a rake face of a known rotary cutting tool is re-ground.
Figure 9:
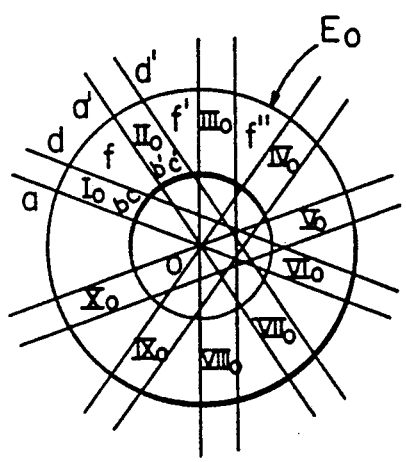
FIG. 9 is a cross-sectional view of a blade material for use in forming a rotary cutting part of a known rotary cutting tool.

As is clear from the above, the cross section of the cutting part according to the present invention is given a configuration in which the outer peripheral portion is made wider than the inner peripheral portion. The cutting part of the present invention is different from conventional ones in this point. As is previously described, the conventional types of cutting parts may be obtained by forming the relevant blade material in such a way that the cross-sectional configuration thereof becomes rectangular when they are sintered. In addition to this method, they may be produced using a hollow blade material Eo having a wall of given thickness in the manner shown in FIG. 9. In other words, in FIG. 9, each of the cutting parts is formed in such a way that each of the rake faces (ab, a'b', - - - ) which each form the respective cutting parts (Io, IIo, - - - ) are disposed within axial planes of the shaft center O', and the faces (cd, c'd' - - - ) opposite to the rake faces do not eat into the rake faces (a'b', - - -) of their adjacent cutting parts (IIo, - - - ). With such a method, it is inevitable that waste portions (f, f' - - -) are created between each of the cutting parts on the blade material Eo. In addition, as shown in FIG. 9, the configuration of the cutting parts Io, IIo, IIIo, IVo and IIVo is made reverse to that of the cutting parts VIo, VIIo, VIIIo, IXo and Xo.

This causes a remarkable reduction in the number of cutting parts that can actually be used.

In contrast with the above, and shown in FIG. 4, each of the cutting parts in the present invention is formed along the lines extending radially outwardly from the shaft center O of the hollow blade material E. In this construction, the waste portions (f, f', - - -) inherent to the conventional blade manufacturing method shown in FIG. 9 can be avoided, and it is also possible to avoid the situation wherein the configuration of a group of cutting parts becomes reverse to that of the other group, thus making it possible to efficiently make full use of the blade material.

The cutting part according to the present invention is able to be produced by either using a conventional method of the type known to persons skilled in the art or the method previously disclosed in Japanese Patent Application No. 56(1981)-107941 by the same applicant. Shown in FIG. 5 is the latter method, in which a cylindrical or conical hollow blade material E is mounted over the numerically controlled rotary shaft of a rotary head h which is mounted on the table t of a wire-cut electric discharge machine, whereupon wire-cut processing is performed by causing the table t to travel in the axial direction i as well as rotary the rotary head h at given angles. Referring to FIG. 4, a given length in the axial direction of the blade material E is first cut at a position A—A where the center of the cutting wire W passes through the shaft center 0, and then after the head h has been rotated at a given angle θ to bring the center of the cutting wire W to a position D—D, the same cutting operation is performed there. It is thus possible to form cutting parts with a rake and opposite faces the extension lines of which each extend toward the shaft center to intersect the others thereat by repeating a series of rotate-and-cut operations like this. Such cutting operations are defined by the formula $\theta = \tan^{-1}\{(\pi \cdot G/L)(\phi°/360°)\}$, wherein L is the axial cutting length, φ the rotational angle given every time a cutting operation is performed, G the diameter of the cutting material to be processed, and θ the helix angle in G.

In addition, in performing the above-mentioned operation, if the rotational angle φ is set at 0, in other words, if no rotation is imparted to the rotational shaft, the helix angle θ is also caused to remain at 0, thus making it possible to obtain a straight blade. The cutting parts which are formed in the above-described manners are secured to a blade rest using conventional methods.

With the present invention, the distance (CB' - - - of FIG. 1) between the inner peripheral portions of the adjacent cutting parts is made greater. This helps improve the rigidity of the tool itself and reduces the cost of manufacturing the cutting parts since none of the blade material E is wasted. Further, when the rake faces need re-grinding, it is possible to make full and efficient use of the blade material. Moreover, using the above wire-cut method makes it possible to obtain a long cutting part having a greater accuracy and a sector angle of more than 360° or various kinds of helix angles. The wire used in the wire-cut electric discharge machine normally has a diameter of 0.2 to 0.3 millimeter, loss of the blade material thus being kept at a very low level.

In the present invention, the sector angle denotes the angle defined by the lines at the ends of the blade, which is uniform and has no joints therein, connecting the outer peripheral portion of the blade with the shaft center, assuming that these lines are projected on the same plane which is normal to the axis of the shaft. In other words, this is the angle defined by the ends of the blade if these ends are projected on the plane normal to the shaft's axis. The helix angle is the angle defined by the axis and the helically formed blade.

What is claimed is:

1. A method for forming a helical cutting element having a rake face and a back thrust face for use in a rotary helical cutting tool having a tool body and a axis of rotation, said method comprising the steps of:
   providing a cylindrical hollow tube having a central axis and made of blade material;
   wire-cutting through said tube along a first helical axial plane and through said central axis, and
   wire-cutting through said tube along a second helical axial plane and through said central axis at an angularly spaced distance from said first axial plane to form the helical cutting element between said first and second helical axial planes wherein the rake face of the helical cutting element is defined by said first helical axial plane and the back thrust face of the helical cutting element is defined by said helical axial plane.

2. A method for forming a helical cutting element having a rake face and a back thrust face for use in a rotary helical cutting tool having a tool body and a axis of rotation, said method comprising the steps of:
   providing a cylindrical hollow tube having a central axis and made of blade material;
   rotating said tube about its central axis;
   cutting through said tube along a first axial plane and through said central axis;
   cutting through said tube along a second axial plane and through said central axis at an angularly spaced distance from said first axial plane to form the helical cutting element between said first and second axial planes wherein the rake face of the helical cutting element is defined by said first axial plane and the back thrust face of the helical cutting element is defined by said second axial plane.

* * * * *